United States Patent Office 3,008,839
Patented Nov. 14, 1961

3,008,839
METHOD FOR PREPARING BULBOUS PRODUCE
ARTICLES FOR SHIPMENT
Rex Louis Brunsing and Wells A. Webb, San Francisco, Calif., assignors to Western Vegetables Industries, Inc., Salinas, Calif., a corporation of California
No Drawing. Filed Mar. 2, 1956, Ser. No. 568,960
7 Claims. (Cl. 99—193)

The present invention is a continuation-in-part of our copending application, Serial No. 425,892.

The present invention relates to the art of harvesting and preparing bulbous produce articles for shipment. The invention relates particularly to the packing and refrigeration of produce articles, such as melons, apples, potatoes, grapes, onions, and the like, that may be injured after harvesting by several hours of exposure to sunshine and warm air near their maturity.

Such produce suffers from dehydration that commences immediately after the stem is severed. The wilting is intensified by warm dry air and exposure to sunshine.

In the conventional method of harvesting and preparing such produce articles for shipment, the articles are placed in field containers and then loaded onto a truck that ultimately conveys them to a packing shed where they are sorted, packed in shipping containers, and then loaded into refrigerator cars. To reduce the damage done by exposure immediately after harvesting, every effort is made to harvest the produce in the cool of the morning and to then rush the produce to the packing shed and into the refrigerator car, thereby conserving as much as possible of the naturally imparted refrigeration of the night sky and helping to protect the severed produce from the dehydrating effects of sunshine and warm air of day. Such efforts are often inadequate and the produce then arrives at its market destination several days later in a partially wilted condition. This is especially true at the peak of the harvest season when congestion of traffic occurs.

In rush seasons, harvest crews continue to harvest produce throughout the day when the heat increases and the produce becomes warmer and is subjected to warmer and dryer air in transit to the packing shed and in the packing shed, thus becoming partially dehydrated and wilted. The cool produce picked in the early morning after a cool night and immediately sent to the packing shed and refrigerator car suffers little, if any, initial damage.

During the hot days when ripening of produce is accelerated, it will be obvious that quick harvesting and shipment to the market is essential if the produce is to be saved from being spoiled before harvesting, and it is at such times that congestion at the packing shed results in long delays between the time the produce is harvested and is cooled in refrigerator cars. During this delay there is great damage from loss of moisture in the produce and wilt, which damage is not immediately apparent but which contributes toward loss of shelf life in the retail stores.

From the above, it is apparent that a problem exists in protecting produce in the immediate post-harvest hours, particularly during summer in desert areas where the sunshine is hot and the air often reaches temperatures of 100° F. to 110° F. before noon.

One of the objects of the present invention is the provision of a method for preventing damage to produce of the character hereinabove mentioned during the delay between harvesting and refrigeration of said produce.

Another object of the invention is the provision of a method harvesting and shipping produce such as melons, apples, potatoes, grapes, onions, and the like, that includes the step of economically and safely precooling such produce immediately after it is harvested and before any subsequent delay occurs without aggravating the normal congestion that occurs during the rush of the harvest season.

A still further object of the invention is the provision of a method of harvesting perishable produce that is damaged by delay between harvesting and refrigeration, and cooling such produce before damage thereto occurs in a manner that enables said produce to be safely shipped in heat insulated containers such as fiberboard cartons.

In order to better understand the present invention, the following Table I is a typical record of what occurs during a harvesting day when cantaloupes are harvested in the Southwestern irrigated desert areas of the United States during June and July:

TABLE I

*Harvesting and shipping cantaloupes by conventional method*

| Operation | Example 1 | | Example 2 | | Example 3 | | Example 4 | |
|---|---|---|---|---|---|---|---|---|
| | Time of day | Melon temp. °F. | Time of day | Melon temp. °F. | Time of day | Melon temp. °F. | Time of day | Melon temp. °F. |
| Cantaloupes are picked, placed on trucks with broad flat beds | 5 a.m. | 90 | 7 a.m. | 92 | 9 a.m. | 95 | 11 a.m. | 100 |
| Transported to packing shed and unloaded | 6 a.m. | 90 | 8:30 a.m. | 93 | 11:30 a.m. | 100 | 2:30 p.m. | 105 |
| Washed, sorted and packed in open crates and stood on loading platform | 7 a.m. | 90 | 9:30 a.m. | 93 | 12:30 p.m. | 101 | 3:30 p.m. | 106 |
| Loaded into refrigerator car, doors closed, fan started | 7:30 a.m. | 90 | 10 a.m. | 93 | 1 p.m. | 102 | 4 p.m. | 107 |
| Precooled by fan in standing refrigerator car | 10 a.m. | 76 | 10 a.m. | 93 | 4 p.m. | 89 | 4 p.m. | 107 |
| Pull-time | Midnight | 73 | Midnight | 90 | Midnight | 86 | Midnight | 103 |
| Refrigeration during shipment | 4 a.m. | 50 | 7 a.m. | 50 | 6 a.m. | 50 | 10 a.m. | 50 |

In the examples cited, the melons are to be loaded and shipped in refrigerated motor trucks, also in mechanical refrigerator cars, also pre-iced refrigerator cars such as those that are equipped with fans that operate from electricity furnished by a dynamo that is rotated by motion of the wheels when the car is in motion. When this kind of car is standing at a siding at a packing shed, the normal procedure is to operate the dynamo with a motor that is temporarily mounted on the car and is supplied with electric current from the packing shed source. The dynamo then operates the fans.

CONVENTIONAL METHOD—EXAMPLE 1

The first truck is loaded by about 5 a.m. and it reaches the packing shed and is unloaded by 6 a.m. The melons are sorted and packed into open crates by 7 a.m. and have been loaded into an iced refrigerator fan car by 7:30 a.m. The doors of the car are then closed and electric fans are started inside the car that circulate air over the bunker ice and the cantaloupes until the cantaloupes have been cooled to about 50° F. This cooling period in the car usually takes about eight hours when the melons are initially at 90° F. and the fans operate without interruption. But during the peak harvest season the first cars loaded must be switched out of the spur track beside the packing shed rather early in the day, perhaps 10 a.m., in order to make room at the loading platform for empty cars. This movement interrupts fan operation inside the cars owing to the necessity of breaking the electrical connection with the shed source. During switching of the cars the fans do not operate owing to the slow wheel velocities attained. Switching usually carries the refrigerator car only to a nearby make-up yard where the cars collect, standing awaiting pull time which is usually around midnight when the train is completed and started on its long journey. Not until after pull time do the car wheels rotate rapidly enough to enable the generator to produce sufficient electric current to cause the air circulating fans inside the car to operate effectively.

Pull time is usually about midnight; then the train moves rapidly, the fans operate and cold air commences to circulate over the ice and melons, refrigerating the melons to 50° F. by about 4 a.m. Thus, twenty-three hours elapsed before the melons were sufficiently cooled.

CONVENTIONAL METHOD—EXAMPLE 2

Melons harvested at 7 a.m. have warmed up in the field to about 92° F. before picking; these are transported to the shed, but congestion causes a delay of one-half hour at the shed before the melons are unloaded. Once taken off the truck they proceed through the packing shed at no more than the usual rate, for packing cannot be materially speeded up to relieve the congestion which occurs on the road outside where the loaded trucks accumulate. The melons are packed, ready for loading in the refrigerator car by 9:30 a.m.; they are loaded by 10 a.m. and the car is switched away with all other loaded cars and placed in a nearby freight yard where it stands until pull time at midnight. The melon temperature of 93° F. at 10 a.m. falls slightly to about 90° F. by midnight owing to thermo-syphon circulation of air at a slow rate inside the car. After the car starts on its journey, the fans operate and the melon temperature is reduced to 50° F. by 7 a.m. Thus a period of 24 hours elapsed before the cantaloupes had been sufficiently cooled.

CONVENTIONAL METHOD—EXAMPLE 3

Melons harvested at 9 a.m. have warmed up in the field to about 95° F., the temperature increases to 100° F. as the delivery truck carrying them to the packing shed is delayed 2½ hours before unloading owing to congestion; the melons then proceed through the packing shed at the normal rate and are in the refrigerator car at 1 p.m., their temperature then being 102° F. The fans are operated at the shed reducing the melon temperature to 89° F. by 4 p.m. The car is then switched to the make-up track, the fans staying idle until pull time at twelve midnight while thermo-syphon convection reduces the temperature to 86° F. After pull time the fans operate again and the load is reduced to 50° by 6 a.m., or twenty-one hours after harvest.

CONVENTIONAL METHOD—EXAMPLE 4

Melons harvested at 11 a.m. have warmed up in the field to about 100° F., the temperature increases to 105° F. as the delivery truck waits 2½ hours for unloading owing to congestion. The packed melons are loaded into the refrigerator car by 4 p.m. at 107° F. The car is immediately switched and stood in the make-up yard until midnight. Thermo-syphon action reduces the temperature of the load to 103° F. during this period. Motion of the car then sets the fans going and the load is cooled to 50° F. by 10 a.m., or twenty-three hours after picking time.

From the foregoing examples, it is apparent that if the produce could be precooled without causing further congestion at the packing sheds, and if such precooling could be started immediately after the produce is harvested and brought in from the fields, and done safely and economically, the produce would not only reach its ultimate destination free from the damage that now occurs during the long delay between harvesting and cooling, but the cooling step during transportation to the final destination would be far more economical than at present, when the actual reduction in temperature is effected during transit.

By our method, the damage caused to occur by delayed cooling is averted. We accomplish this object by providing a precooling step whereby the produce articles are quickly reduced to a temperature at which there is no farther deterioration. The precooling operation is performed on the produce immediately upon arrival at the packing center. The precooled produce is then transported to the packing shed. Precooling facilities of such capacity are provided so that there is no delay before precooling to a safe keeping temperature, and the produce awaits its turn to be packed at the packing shed without deterioration occurring during the waiting period. Therefore, congestion at the packing shed does not result in wilting of the produce. The produce is already cooled when loaded and no damage occurs in the car.

The precooled produce need not be packed in expensive open crates of no heat insulating value which are required to facilitate cooling by the fans in the refrigerator car, but may be shipped to market in heat insulating containers such as sealed fiberboard cartons. Refrigerated produce so packed retains its refrigeration for long periods after being unloaded from the refrigerated transport.

We have found that in certain produce articles such as cantaloupes, absorption of moisture into the void at the center during cooling by water at atmospheric pressure does not take place to a deleterious degree if the water is applied lightly as a spray. The risk of moisture absorption is further reduced if the spray is intermittent, and the cooling effect may be enhanced and continued if air is circulated among the melons and evaporative cooling takes place at atmospheric pressure. But such atmospheric pressure evaporative cooling cannot proceed below the wet bulb temperature of the ambient atmosphere which, in cantaloupe growing regions of the Southwest, is typically 65 to 75° F. when the dry bulb temperature is 100° F. to 110° F. Cooling cantaloupes at 90° F. to 100° F. by intermittent water spray at atmospheric pressure will reduce the cantaloupe temperature to approximately 75° F. in about one hour. Such water may be collected after it has been cooled by passing over the spray, and then circulated over condensers and other apparatus of a vacuum cooling plant, as will be described, facilitating the vacuum stage.

Precooling by dipping the produce in refrigerated water cannot be employed at atmospheric pressure upon those produce articles that are hollow, such as cantaloupes, Persian melons, onions and the like. Voids containing air trapped in the interior of the article often become connected by capillary passageways, cracks, and the like, with the exterior. When produce articles containing such connected voids are cooled by submergence, air in the void shrinks and water is drawn into the lower pressure region of the void. The presence of water in the voids of such produce articles destroys market value of the article.

We have discovered that no water is drawn into the voids of produce articles undergoing submergence cooling if the conditions of cooling and vacuum drawn are such as to produce, at all times during submergence, a lower absolute pressure of vapors at the surface of the produce articles then exists inside the voids of the produce article. Under such conditions, vapors press to escape the voids and oppose all entry of water through cracks and other capillary passageways that may exist connecting the void with the exterior. The interior voids are thereby prevented from being flooded.

We have found that cooling without flooding the interior voids takes place when the produce with field heat is placed in vacuum chamber and the chamber is continuously evacuated with a suitable vacuum pump which removes water vapor and air while water is being sprayed on the produce until the absolute pressure is reduced to approximately preferably 0.08 lb. per square inch and the water spray is at approximately 40° F. to 32° F. but is not frozen the absolute pressure however may be maintained between 0.2 and 0.0887 lb. per square inch.

A length of time of between 40–80 minutes or longer may be required for heat to flow out of the interior of the produce and be absorbed by vaporizing moisture on the exterior surface. The time required for cooling depends upon the thickness and conductivity of the flesh of the produce article. Grapes, for example, can be cooled in thirty minutes or less times, whereas cantaloupes, large onions, potatoes may require 60 to 80 minutes.

We have found it preferable to transport and cool produce in large units such as pallet loads or bins containing say 1,000 to 2,000 pounds of produce, said large units being adapted for transfer from truck to vacuum cooling chamber and vice versa by means of motorized lift-trucks.

The produce, cooled to say 40–60° F. or lower by vacuum, in the manner described for avoiding absorption of water into voids, is removed form the vacuum chamber streptomycin may be used. Other effective antibiotics are terramycin and mixtures of streptomycin with terramycin oxytetracycline, all in sufficiently low concentrations to avoid imparting toxic qualities to the fruit, but capable of killing fungus spores and bacterial infections which might otherwise cause deterioration of the produce during storage and shipment.

There is a time relationship involved in the delayed absorption of antibiotic material that may be taken advantage of whereby the initial application of a spray having possible toxic qualities during the vacuum cooling phase may be utilized to destroy surface infections of bacteria and fungus on the produce articles, and the toxic material may be washed off in a later stage of the process by application of a spray of water before the flesh of the produce has absorbed toxic material.

The preferred method by the present invention for harvesting and shipping cantaloupes is illustrated on Table II which is constructed to show the effect of improved handling methods in expediting the shipment of melons during the period when they must be exposed to summer air and sunshine of the same intensity as described for Table I.

TABLE II

*Harvesting and shipping cantaloupes by method of the present invention*

| Operation | Example 5 | | Example 6 | | Example 7 | | Example 8 | |
|---|---|---|---|---|---|---|---|---|
| | Completed | Melon temp. °F. | Completed | Melon temp. °F. | Completed | Melon temp. °F. | Completed | Melon temp. °F. |
| Cantaloupes are picked, placed in bins on trucks | 5 a.m. | 90 | 7 a.m. | 92 | 9 a.m. | 95 | 11 a.m. | 100 |
| Transported to cooling plant and unloaded | 6 a.m. | 90 | 8 a.m. | 92 | 10 a.m. | 98 | 12 a.m. | 102 |
| Cooled by intermittent water spray | 7 a.m. | 75 | 9 a.m. | 75 | 12 noon | 75 | 3 p.m. | 75 |
| Cooled by vacuum and water spray | 8:15 a.m. | 40 | 10:15 a.m. | 40 | 1:15 p.m. | 40 | 4:15 p.m. | 40 |
| Transported to packing shed and unloaded | 8:30 a.m. | 41 | 10:30 a.m. | 41 | 1:30 p.m. | 41 | 4:30 p.m. | 41 |
| Sorted and packed into cartons and stood on loading platform | 9 a.m. | 50 | 11 a.m. | 50 | 2 p.m. | 50 | 5 p.m. | 50 |
| Loaded into refrigerator car, doors closed | 10 a.m. | 51 | 12 a.m. | 51 | 3 p.m. | 51 | 6 p.m. | 51 |
| Pull-time | Midnight | 50 | Midnight | 50 | Midnight | 50 | Midnight | 50 |
| Initial refrigeration maintained by fans in moving refrigerator car | | 50 | | 50 | | 50 | | 50 | and stored until such time as relief of congestion permits it to be packed into shipping containers.

To conserve refrigeration during the waiting period, we prefer to transport the produce in bins whose walls have refrigeration insulating qualities; such bins are returned to the field after they have been emptied at the packing shed, and are refilled with freshly harvested produce, then they are brought to the cooling station, placed inside the vacuum chamber and the contents are cooled.

When produce in bins is being cooled, the arrangement must be such that spray water can enter the bin and wet all produce surfaces inside and water vapor can evaporate and escape the confines of the bin without undue constriction. This is accomplished by providing ample vents in top and bottom of the bin; but such vents must be arranged so as to restrict circulation of air over the produce and loss of refrigeration during the period after the bin with its contents is removed from the vacuum cooling chamber and before the contents are emptied at the packing shed.

In order to kill spores and bacteria on the produce and also to prevent spread of plant disease among articles being processed, the water used to spray the cantaloupes may contain an antiseptic, also a foaming or wetting agent to facilitate moistening the surfaces as described in our aforementioned patent application. Such antiseptic agent may be any of the older fungacides such as sodium hypochlorite, or it may preferably be an antibiotic. Owing to the relatively long period of time when the spray is in contact with the produce, the spray used in vacuum cooling may have lower concentrations of antibiotic than sprays commonly used against growing crops. Thus vacuum cooling sprays containing 0.1% to 0.01% or less of foaming agent such as sodium alkyl aryl sulfonate and from 50 to 1 parts per million of antibiotic such as

IMPROVED METHOD—EXAMPLE 5

Cantaloupes harvested at 5 a.m. are loaded into bins and transported and unloaded at the cooling plant by 6 a.m., there they are placed under intermittent water spray and cooled to 75° F. by 7 a.m., then they are placed in a vacuum chamber and cooled to 40° F. by application of water spray while vacuum is being drawn for 1¼ hours until 8:15 a.m.; then they are transported and unloaded at the packing shed by 8:30 a.m.; then they are sorted and packed into insulating cartons and stood on the car loading platform at 50° F. by 9 a.m.; then they are loaded into the refrigerator car by 10 a.m. at 51° F. and the doors are closed five hours after harvest. Thermo-syphon circulation cools the melons to 50° F. before pull time at midnight, and they are on their way to market.

IMPROVED METHOD—EXAMPLE 6

Cantaloupes harvested at 7 a.m. are processed through as in Example 5, arriving in the refrigerator car at 51° F. five hours after harvest. Congestion has not delayed operations.

IMPROVED METHOD—EXAMPLE 7

Cantaloupes harvested at 9 a.m. when congestion is felt, are kept for two hours, from 10 a.m. until 12 noon in the spray cooling department during which time the melons have been cooling to 75° F. After this delay, the melons are vacuum cooled to 40° F., then transported to the packing shed, packed and loaded by 3 p.m. at 51° F.

IMPROVED METHOD—EXAMPLE 8

Cantaloupes harvested at 11 a.m. when congestion is high, are kept for three hours from 12 a.m. until 3 p.m. in the spray cooling department during which time the melons have been cooled to 75° F. After this delay the melons are vacuum cooled to 40° F., then transported to the packing shed, packed and loaded by 6 p.m. at 51° F.

It is seen by these examples that bulbous produce may be harvested rapidly during the peak of the harvest season, and though congestion occurs, the accumulation takes place at the cooling plant where the produce temperature is promptly reduced to levels where deterioration of the produce is prevented, and when the produce is finally loaded into refrigerator cars, no further cooling is required. This makes it possible to ship ripe produce long distances at the peak of the harvest season with a minimum consumption of refrigerant during transit.

In the packing shed, the produce articles are sub-grouped into lots of 12, 24, 36, etc., as demanded by the market, and each sub-group is placed into a package which is sealed to enhance heat insulating properties of the package. No further refrigeration effort need now be expended to cool the produce, as the articles are already at the optimum shipping temperature.

Although their rate of warm-up is greatly retarded by provision of a heat insulated container such as a multi-walled fiberboard carton, nevertheless, in warm air, some warm-up of the produce does occur. For that reason it is preferred to ship the produce in refrigerated transports where the refrigerating effort goes toward providing a cold shipping space for the produce and is not expended to any material extent for further reducing the produce temperature. The heat insulating properties of the container are utilized for conserving refrigeration of the produce, after the produce is packed before the package is placed in the refrigerated transport; and again at the end of the journey after the package is removed from the refrigerated transport, the insulating properties of the package protect the contents against warm-up. It is to be understood that our invention is not to be limited to the specific examples of the foregoing specification, but is to be interpreted broadly as defined by the following claims.

We claim:

1. The method of harvesting and preparing nonleafy fruit and vegetable products for market that comprises the steps of: harvesting said products at approximately atmospheric temperature, and packing them in relatively large bulk groups, then progressively cooling the products of said groups by wetting them with water of a temperature below atmospheric temperature, then enclosing said products within an enclosed space and quickly evacuating the air from said space to an absolute pressure of 0.2 to 0.0887 lb. per square inch and then spraying said produce with water until the temperature in said produce is stabilized before said produce is frozen at the air pressure under which they have been sprayed, and thereafter restoring atmospheric pressure to said products and immediately thereafter packaging them in smaller groups in substantially closed containers of heat insulating material and placing said packaged products under refrigeration.

2. The method of harvesting and preparing cantaloupes for market that comprises the steps of harvesting said products in the field, and transporting them to a precooling point, intermittently spraying said products with water of a temperature below atmospheric temperature at said point until the temperature of said products is below atmospheric temperature and below the temperature of said products in the field, then removing said products from said point and enclosing them in an enclosed space, generally evacuating the air from said space until the absolute air pressure in said space is from about 0.2 to 0.0887 lb. per square inch and then spraying said products with water until the temperature within said products is substantially stabilized at said pressure before said products are frozen, and thereafter restoring atmospheric pressure to said products and immediately thereafter packaging them in smaller groups in substantially closed containers of heat insulating material and placing said packaged products under refrigeration.

3. The method of harvesting and preparing nonleafy fruit and vegetable products for market that comprises the steps of: harvesting said products in the field with said products at approximately atmospheric temperature and packing them in large groups in drainable enclosures, then transporting the groups so enclosed to a precooling point, spraying said groups at said point with water of a temperature substantially below atmospheric temperature thereby progressively cooling said products to a temperature below atmospheric temperature, then evacuating the air from around said products to an absolute air pressure of from about 0.2 to 0.0887 and spraying said products with water while they are at said pressure until the temperature within said products is stabilized at said pressure before said products are frozen, and thereafter restoring atmospheric pressure to said products and immediately thereafter packaging them in smaller groups in substantially closed containers of heat insulating material and placing said packaged products under refrigeration.

4. The method of harvesting and preparing nonleafy fruit and vegetable products for market that comprises the steps of: harvesting said products at atmospheric temperature; spraying said products intermittently with water at a temperature below atmospheric temperature and simultaneously circulating air around them at atmospheric pressure; placing said products within an airtight chamber; evacuating air from said chamber to a pressure of 0.2 to 0.087 lb. per square inch; spraying said produce with water until the temperature of said produce is stabilized at a temperature above 32° F.; restoring atmospheric pressure to said space; and packaging said products for shipment.

5. The method of harvesting and preparing nonleafy fruit and vegetable products for market that comprises the steps of: harvesting said products at atmospheric temperature; placing said products in an airtight chamber; withdrawing air from said chamber to reduce the pressure therein from 0.2 to 0.0887 lb. per square inch; submerging said products in water in said evacuated chamber; introducing air into said chamber until atmospheric pressure is reached; removing said products from said water but leaving said products in said chamber; again withdrawing air from said chamber to reduce the pressure therein from 0.2 to 0.0887 lb. per square inch; spraying said produce with water; restoring atmospheric pressure to said space; and packaging said products for shipment.

6. The method of harvesting and preparing cantaloupes for market that comprises the steps of: harvesting said cantaloupes at atmospheric temperature; spraying said cantaloupes intermittently with water at a temperature below atmospheric temperature and simultaneously circulating air around them at atmospheric pressure; placing said cantaloupes within an airtight chamber; evacuating air from said chamber to a pressure of 0.2 to 0.0887 lb. per square inch; spraying said cataloupes with water until the temperature of said cantaloupes is stabilized at a temperature above 32° F.; restoring atmospheric pressure to said space; and packaging said cantaloupes for shipment.

7. The method of harvesting and preparing cantaloupes for market that comprises the steps of: harvesting said cantaloupes at atmospheric temperature; placing said cantaloupes in an airtight chamber; withdrawing air from said chamber to reduce the pressure therein from 0.2 to 0.0887 lb. per square inch; submerging said cantaloupes in water in said evacuated chamber; introducing air into said chamber until atmospheric pressure is reached; removing said cantaloupes from said water but leaving said cantaloupes in said chamber; again withdrawing air from said chamber to reduce the pressure therein from 0.2 to 0.0887 lb. per square inch; spraying said cantaloupes with water; restoring atmospheric pressure to said space; and packaging said cantaloupes for shipment.

References Cited in the file of this patent

UNITED STATES PATENTS

| | | |
|---|---|---|
| 1,617,630 | Gay | Feb. 15, 1927 |
| 1,884,429 | Warner | Oct. 25, 1932 |
| 2,344,151 | Kasser | Mar. 14, 1944 |
| 2,684,907 | Brunsing | July 27, 1954 |

OTHER REFERENCES

Refrigeration Journal, October 1953, pp. 10, 12, 14, 16, 17.